United States Patent
Fornage (10) Patent No.: US 10,734,913 B2
(45) Date of Patent: Aug. 4, 2020

(54) METHOD AND APPARATUS FOR BIDIRECTIONAL POWER PRODUCTION IN A POWER MODULE

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 858 days.

(21) Appl. No.: 14/021,257

(22) Filed: Sep. 9, 2013

(65) Prior Publication Data

US 2014/0070619 A1 Mar. 13, 2014

Related U.S. Application Data

(60) Provisional application No. 61/699,688, filed on Sep. 11, 2012.

(51) Int. Cl.
*H02J 3/00* (2006.01)
*H02M 7/44* (2006.01)
*H02J 3/38* (2006.01)

(52) U.S. Cl.
CPC .............. *H02M 7/44* (2013.01); *H02J 3/00* (2013.01); *H02J 3/383* (2013.01); *Y02E 10/563* (2013.01); *Y10T 307/707* (2015.04)

(58) Field of Classification Search
CPC ...... H02J 3/38; H02J 3/32; H02J 3/36; H02M 5/458; H02M 5/45; H01J 1/10; H01J 1/102
USPC ........ 307/82, 66, 44, 46, 45, 47; 363/95, 97, 363/37, 82, 96
See application file for complete search history.

(56) References Cited

U.S. PATENT DOCUMENTS

| | | | | |
|---|---|---|---|---|
| 4,251,735 A | * | 2/1981 | Coleman | H02J 3/32 307/46 |
| 5,272,615 A | * | 12/1993 | Wert | H02M 7/48 363/41 |
| 7,768,155 B2 | | 8/2010 | Fornage | |
| 7,796,412 B2 | | 9/2010 | Fornage | |
| 7,986,539 B2 | * | 7/2011 | Fornage | G05F 1/67 307/140 |
| 8,076,802 B2 | | 12/2011 | Fornage | |
| 8,093,756 B2 | | 1/2012 | Porter et al. | |
| 8,350,411 B2 | | 1/2013 | Kimball et al. | |
| 8,638,581 B2 | | 1/2014 | Zacharias et al. | |

(Continued)

FOREIGN PATENT DOCUMENTS

JP 2009-261201 A 11/2009
WO WO 2006/043837 A2 4/2006

OTHER PUBLICATIONS

IEEE 2011—(978-1-61284-220-2/11 (Year: 2011).*

(Continued)

*Primary Examiner* — Rexford N Barnie
*Assistant Examiner* — Jagdeep S Dhillon
(74) *Attorney, Agent, or Firm* — Moser Taboada (57) ABSTRACT

Method and apparatus for generating power. In one embodiment the method comprises determining a value of a DC parameter pertaining to a DC power source providing DC power to an inverter; comparing the value to a threshold; and operating the inverter to generate positive power or negative power based on a result of comparing the value to the threshold.

20 Claims, 5 Drawing Sheets

(56) References Cited

U.S. PATENT DOCUMENTS

| | | | |
|---|---|---|---|
| 2005/0040711 A1 | 2/2005 | West | |
| 2010/0091532 A1 | 4/2010 | Fornage | |
| 2010/0219688 A1* | 9/2010 | Shyu | H02J 7/35 307/66 |
| 2010/0231045 A1* | 9/2010 | Collins | H02J 7/35 307/47 |
| 2010/0276998 A1 | 11/2010 | Luo et al. | |
| 2011/0012430 A1* | 1/2011 | Cheng | H01L 31/02021 307/82 |
| 2011/0050174 A1 | 3/2011 | King et al. | |
| 2011/0273022 A1 | 11/2011 | Kevin et al. | |
| 2012/0002450 A1 | 1/2012 | Mueller | |
| 2012/0051102 A1* | 3/2012 | Wagoner | H02M 1/36 363/49 |
| 2012/0072041 A1* | 3/2012 | Miller | G01S 19/14 700/292 |
| 2012/0081933 A1* | 4/2012 | Garrity | H02M 7/4807 363/37 |
| 2012/0290145 A1* | 11/2012 | Joshi | H02J 3/385 700/298 |

OTHER PUBLICATIONS

IEEE 2011 9978-1-61284-220-2/11 Analysis and control of PV Inverters Operating in VAR MOde at Night, Ali Maknouninejad, 2011.*
International Search Report and Written Opinion dated Dec. 17, 2013 for Application No. PCT/US2013/058717, 11 pgs.
European Search Report for EP 13837487.1 dated Mar. 21, 2016, 7 pgs.

* cited by examiner

METHOD AND APPARATUS FOR BIDIRECTIONAL POWER PRODUCTION IN A POWER MODULE

CROSS-REFERENCE TO RELATED APPLICATIONS

This application claims benefit of U.S. provisional patent application Ser. No. 61/699,688, filed Sep. 11, 2012, which is herein incorporated in its entirety by reference.

BACKGROUND OF THE INVENTION

Field of the Invention

Embodiments of the present disclosure generally relate to power conversion and, more particularly, to a method and apparatus for bidirectional power production in a power module.

Description of the Related Art

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

During daylight operating, sufficient energy generally exists so that a PV module supplies power to a corresponding inverter and the inverter operates to generate a positive output power. However, as the level of irradiance eventually diminishes and becomes nonexistent, such as in the evening, the level of power from the PV module to the inverter also decreases until the power from the PV module is no longer sufficient for the inverter to continue generating positive power. At such time, the inverter may shut down and be unable to perform certain functions, such as providing final data to a centralized controller or executing advanced grid functions (e.g., the utility might request an inverter to generate reactive power at night), until initial activation the following morning.

Therefore, there is a need in the art for a method and apparatus for operating an inverter during periods of insufficient energy for forward power conversion.

SUMMARY OF THE INVENTION

Embodiments of the present invention generally relate to a method and apparatus for generating power substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
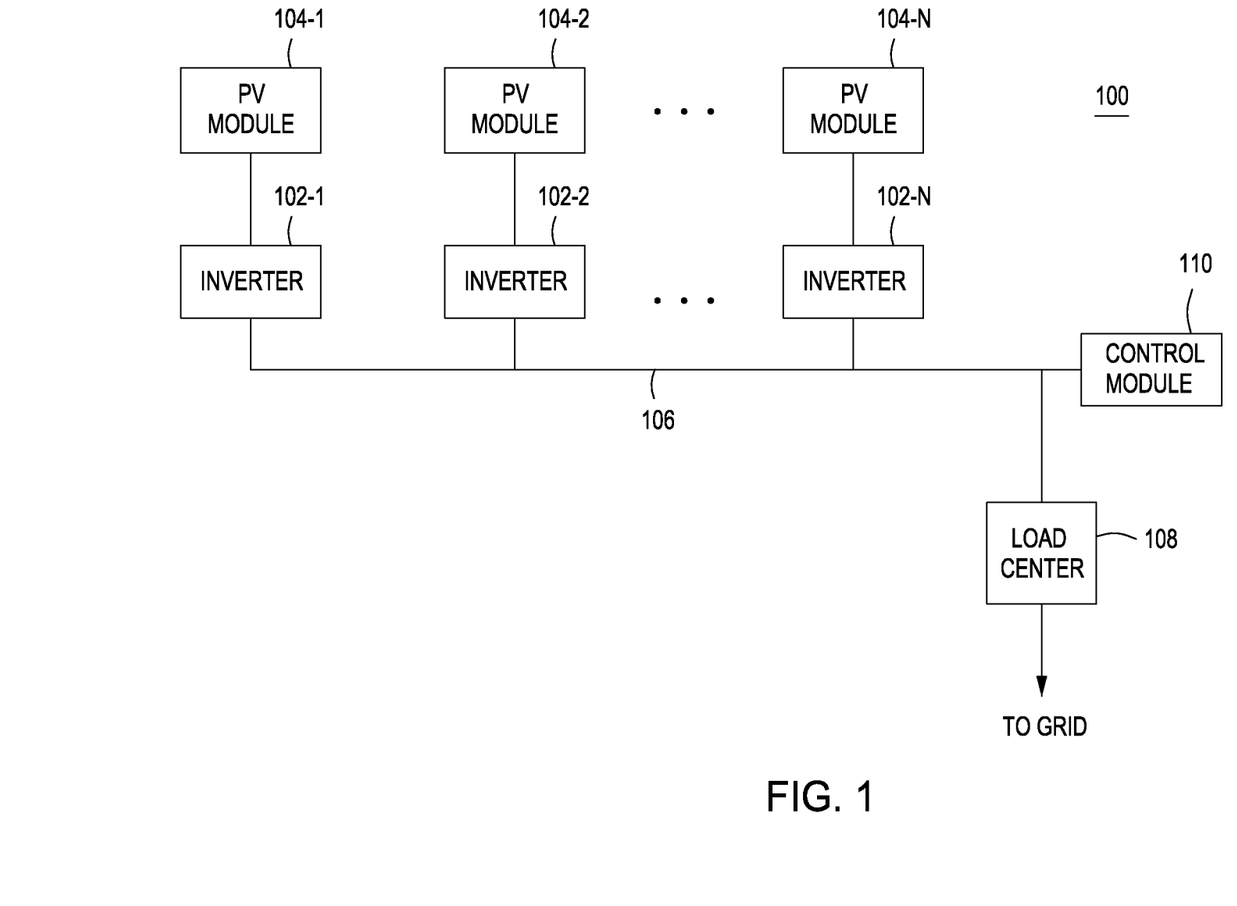
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules 104, an AC bus 106, a load center 108, and a control module 110.

Each inverter $102_1$, $102_2$ ... $102_n$ is coupled to a PV module $104_1$, $104_2$ ... $104_n$, respectively, in a one-to-one correspondence and converts DC power from the corresponding PV module 104 to AC power. In some embodiments, the inverters 102 may additionally or alternatively receive DC power from one or more suitable DC sources other than the PV modules 104, such as other types of renewable energy sources (e.g., wind turbines, a hydroelectric system, or similar renewable energy source), a battery, or the like. In one or more other embodiments, a DC-DC converter may be coupled between each PV module 104 and each inverter 102 (e.g., one converter per PV module 104), and/or multiple PV modules 104 may be coupled to a single inverter 102 (e.g., a single centralized inverter).

The inverters 102 are coupled to the AC bus 106, which in turn is coupled to the control module 110 and the load center 108. The control module 110 is capable of communicating with the inverters 102, for example for issuing command and control signals to the inverters 102 and/or for receiving information from the inverters 102. The load center 108 houses connections between incoming power lines from a commercial power grid distribution system and the AC bus 106. The inverters 102 convert DC power generated by the PV modules 104 into AC power and generally meter out AC current that is in-phase with the AC commercial power grid voltage, although the inverters 102 may additionally or alternatively generate reactive power (Volt-Ampere reactive, or VAr). The system 100 couples the generated AC power to the commercial power grid via the load center 108. Additionally or alternatively, the generated power may be distributed for use via the load center to one or more appliances, and/or the generated energy may be stored for later use, for example using batteries, heated water, hydro pumping, $H_2O$-to-hydrogen conversion, or the like.

Each of the inverters 102 employs a DC voltage control technique to operate the corresponding coupled PV module 104 at a desired DC control voltage, also referred to as a set point, such as the PV module's maximum power point (MPP) to generate an optimal power output from the PV module 104 at a given temperature and solar irradiation. The DC voltage control technique employed by an inverter 102 modulates the power flow from the inverter 102 in order to bias the corresponding PV module 104 at the desired voltage, and thus controls the voltage across the PV module 104. In accordance with one or more embodiments of the present invention, the DC voltage control technique employed by the inverter 102 is utilized to drive the inverter 102 to generate a negative power when the level of irradiance on the corresponding PV module 104 is below an irradiance threshold, for example an irradiance threshold on the order of 20 $W/m^2$. Such a negative power flow maintains the inverter 102 in an operable state during periods of little to no irradiance (for example, at night) and allows the inverter 102 to continue performing functions such as providing reactive power (e.g., the utility may request an inverter to generate reactive power at night), completing "housekeeping" tasks (e.g., sending and/or receiving operations and maintenance messages to the control module 110), providing indications of PV module and/or inverter theft, and similar functions, even when no light is present.

In some other embodiments, some hysteresis may be added in determining when to generate the negative power; additionally or alternatively, the inverter 102 may be driven to generate the negative power based on a level of PV module current (e.g., on the order of 20 mA) and/or PV module voltage. For example, in some embodiments the MPP desired voltage may be controlled such that it does not drop below a given threshold value, such as 16V on a 60-cell PV module. Upon reaching such a minimum value, the inverter 102 would be driven to allow the power control to become negative and use the grid power to sustain the PV module voltage at the minimum value.

As described further below, power conversion in the inverter 102 is controlled to allow bidirectional power flow. In order to support such bidirectional power flow, the inverter 102 comprises active switches capable of passing current in both directions and is devoid of diodes within the path of power flow. The present invention may be applied to any power conversion module comprising such active switches and not containing diodes within the path of power flow, such as voltage source inverters, cycloconverters, and the like.

Figure 2:
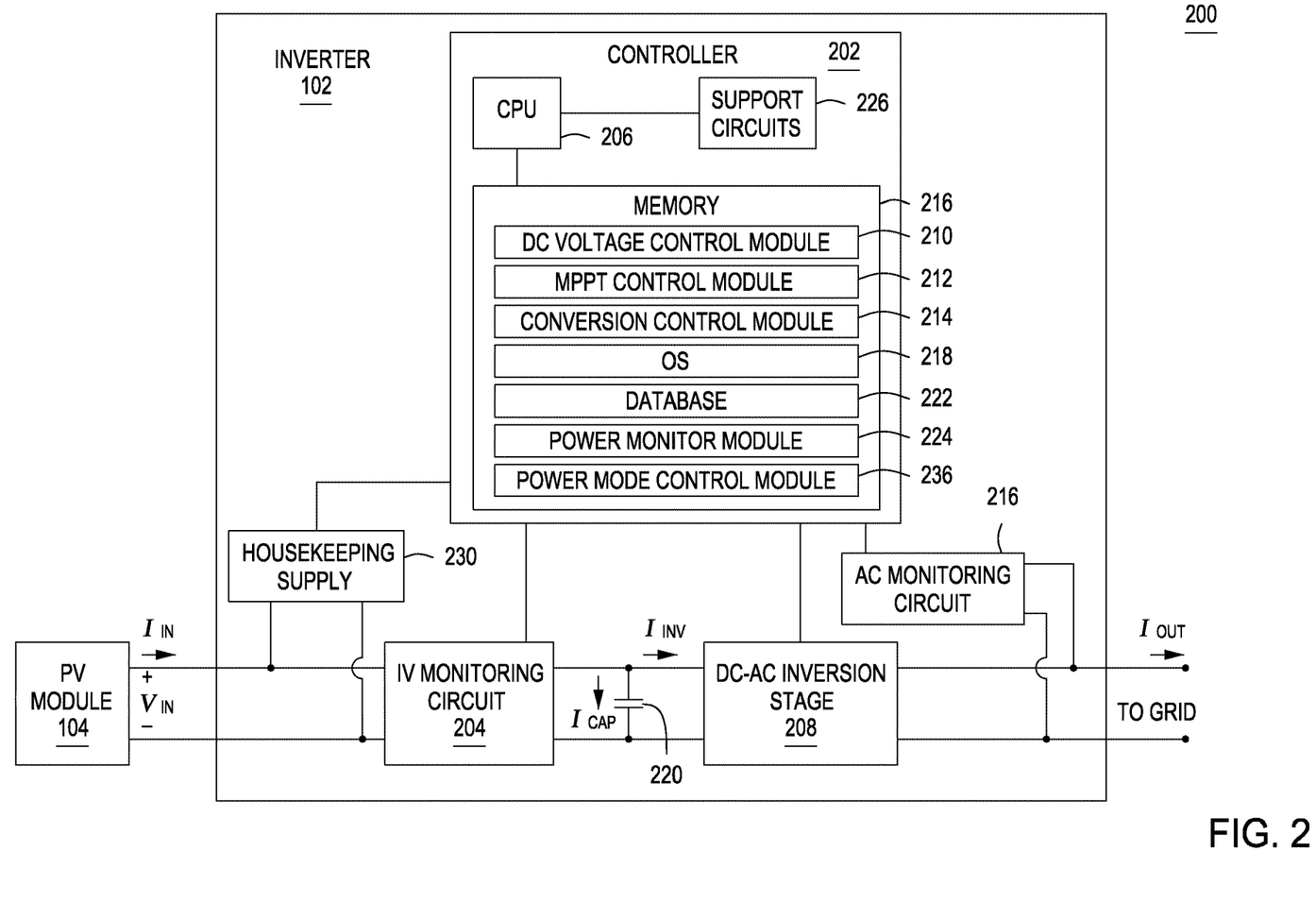
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 204, a capacitor 220, a DC-AC inversion stage 208, an AC monitoring circuit 216, and a controller 202.

The I-V monitoring circuit 204 is coupled across the PV module 104 and the input capacitor 220. The DC-AC inversion stage 208 is coupled across the input capacitor 220 and two output terminals of the inverter 102, and the AC monitoring circuit 216 is coupled across the output from the DC-AC inversion stage. A housekeeping supply 230 (described below with respect to FIG. 3) is coupled across the PV module 104. The controller 202 is coupled to each of the I-V monitoring circuit 204, the DC-AC inversion stage 208, the housekeeping supply 230, and the AC monitoring circuit 216.

The I-V monitoring circuit 204 provides a means for sampling the DC current and voltage at the input of the inverter 102, and the AC monitoring circuit 216 provides a means for sampling the AC current and voltage at the output of the inverter 102. The I-V monitoring circuit 204 and the AC monitoring circuit 216 provide such samples (i.e., signals indicative of the sampled currents and voltages) to the controller 202, as described below with respect to FIG. 3, for use in operatively controlling the DC-AC inversion stage 208.

The controller 202 comprises at least one central processing unit (CPU) 206, which is coupled to support circuits 226 and to a memory 216. The CPU 206 may comprise one or more processors, microprocessors, microcontrollers and combinations thereof configured to execute non-transient software instructions to perform various tasks in accordance with the present invention. The CPU 206 may additionally or alternatively include one or more application specific integrated circuits (ASICs). The support circuits 226 are well known circuits used to promote functionality of the CPU 206. Such circuits include, but are not limited to, a cache, power supplies, clock circuits, buses, network cards, input/output (I/O) circuits, and the like. The controller 202 may be implemented using a general purpose computer that, when executing particular software, becomes a specific purpose computer for performing various embodiments of the present invention.

The memory 216 may comprise random access memory, read only memory, removable disk memory, flash memory, and various combinations of these types of memory. The memory 216 is sometimes referred to as main memory and may, in part, be used as cache memory or buffer memory. The memory 216 generally stores the operating system (OS) 218 of the controller 202. The operating system 218 may be one of a number of commercially available operating systems such as, but not limited to, Linux, Real-Time Operating System (RTOS), and the like.

The memory 216 stores non-transient processor-executable instructions and/or data that may be executed by and/or used by the CPU 206. These processor-executable instructions may comprise firmware, software, and the like, or some combination thereof.

The memory 216 may store various forms of application software, such as a power monitor module 224, an MPPT control module 212, a power mode control module 236, a DC voltage control module 210, and a conversion control module 214. The functionality of such modules is described in detail below with respect to FIG. 3. The memory 216 may additionally comprise a database 222 for storing data related to the operation of the inverter 102 and/or the present invention, such as one or more thresholds used in determining whether to generate positive or negative power.

In some embodiments, one or more of the power monitor module 224, the MPPT control module 212, the power mode control module 236, the DC voltage control module 210, the conversion control module 214, and the database 222, or portions thereof, may be implemented in software, firmware, hardware, or a combination thereof.

Figure 3:
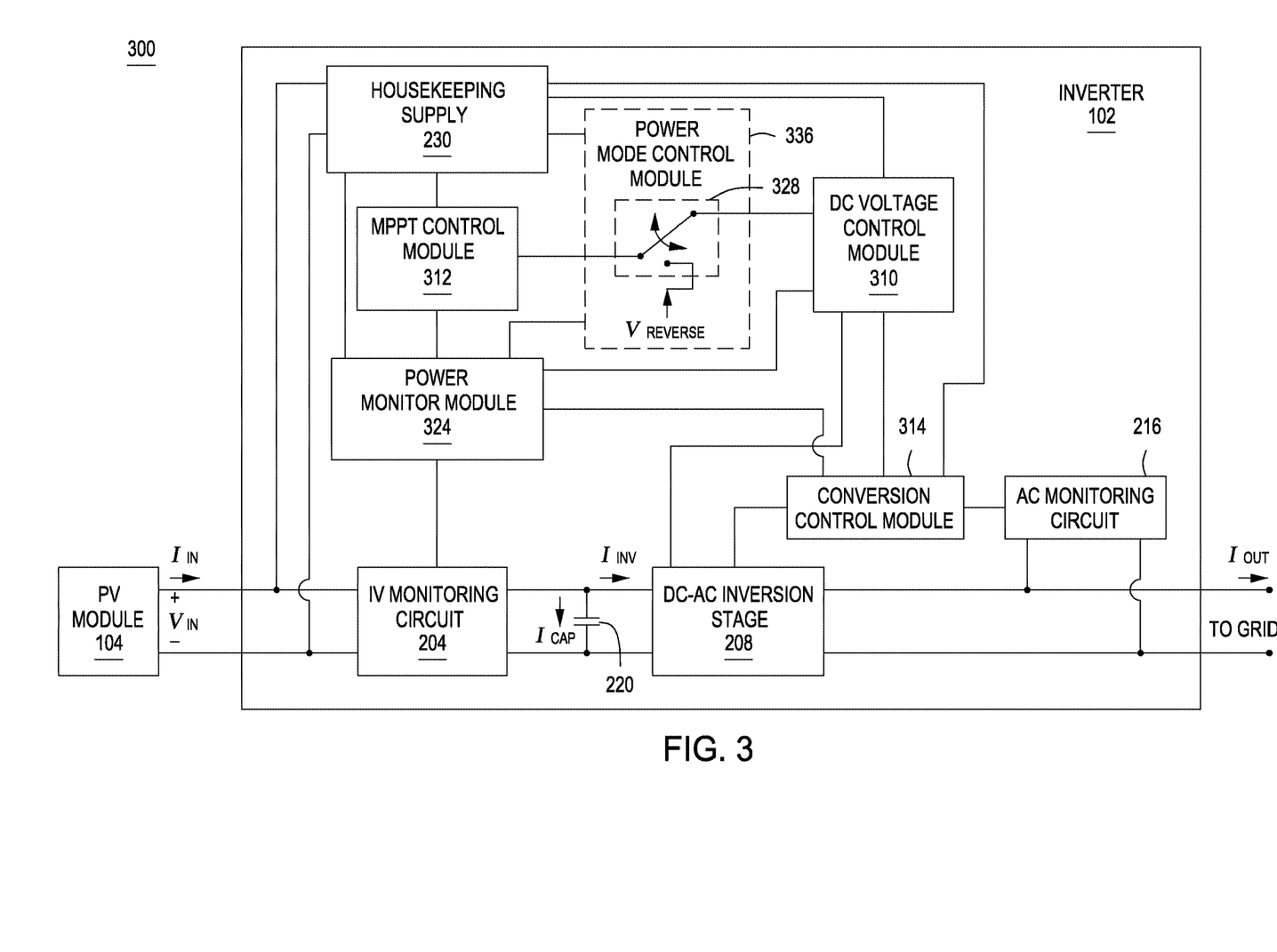
FIG. 3 is a functional block diagram of an inverter 102 in accordance with one or more embodiments of the present invention.

FIG. 3 is a functional block diagram of an inverter 102 in accordance with one or more embodiments of the present invention. The inverter 102 comprises the I-V monitoring circuit 204, the input capacitor 220, the DC-AC inversion stage 208, and the AC monitoring circuit 216. The inverter 102 further comprises a power monitor module 324 (an implementation of the power monitor module 224), an MPPT control module 312 (an implementation of the MPPT control module 212), a power mode control module 336 (an implementation of the power mode control module 236), a DC voltage control module 310 (an implementation of the DC voltage control module 210), and a conversion control module 314 (an implementation of the conversion control module 214). The inverter 102 generally comprises the housekeeping supply 230 that provides energy to all control circuits of the inverter 102; typically, the housekeeping supply obtains power from the PV module voltage. The housekeeping supply 230 is a DC-DC converter and may be a buck converter, a flyback converter, a single-ended primary-inductor converter (SEPIC), or the like, and is coupled across the PV module 104 and to each of the MPPT control module 312, power monitor module 324, power mode control module 336, DC voltage control module 310, and the conversion control module 314.

The I-V monitoring circuit 204 is coupled to the PV module 104, the input capacitor 220, and the power monitor module 324. The power monitor module 324 is further coupled to the DC voltage control module 310, the MPPT control module 312, the conversion control module 314, and the power mode control module 336 which comprises the switch 328. The DC voltage control module 310 and the MPPT control module 312 are coupled to first and second terminals, respectively, of the switch 328. The DC-AC inversion stage 208 is coupled across the input capacitor 220, and is further coupled to the DC voltage control module 310 and the conversion control module 314. The conversion control module 314 is coupled to the DC voltage control module 310, the power monitor module 324, and to the AC monitoring circuit 216, which is further coupled across the output of the DC-AC inversion stage 208.

The I-V monitoring module 204 obtains samples (i.e., measurements) of the instantaneous input voltage Vin and current Iin from the PV module 104 and couples such samples—i.e., signals indicative of the measured values of the voltage and current—to the power monitor module 324. The I-V monitoring module 204 may perform such sampling at a rate anywhere from approximately 1 kilo samples per second (ksps) to approximately 10 Mega samples per second (Msps). In some embodiments, the I-V monitoring module 204 comprises analog-to-digital converters (ADC) for generating the samples in a digital format.

Using the input voltage and current samples received from the I-V monitoring module 204, the power monitor module 324 determines an instantaneous input power Pin and couples the determined input power Pin to the power mode control module 336 for operating the inverter 102 in either a "forward-power" operating mode (i.e., when there is sufficient energy to operate the inverter in a forward-power generating mode) or a "reverse-power" operating mode (i.e., when there is insufficient energy to operate the inverter in a forward-power generating mode), as described further below. The power monitor module 324 additionally determines first and second power measurements, $P_1$ and $P_2$, respectively, using the input voltage and current samples from the I-V monitoring module 204. The first and second power measurements $P_1$ and $P_2$ are coupled to the MPPT control module 312 for determining whether the PV module 104 is operating at, above, or below the MPP. Additionally, the power monitor module 324 determines a DC (i.e., average) voltage across the PV module 104, Vdc, and couples the average PV module voltage Vdc to the DC voltage control module 310 for use in determining an output current Iout that the inverter 102 will be driven to generate. In one or more embodiments, the inverter 102 may employ a "burst" mode operation that stores energy during one or more grid voltage cycles and subsequently "bursts" the stored energy to the grid. In such embodiments, the power monitor module 324 may further generate a burst current adjustment signal, Ib-adj, and couple such control signal to the DC voltage control module for use in adjusting the required inverter output current Iout during burst mode such that it corresponds to a suitable burst mode output current.

In some embodiments, the first and second power measurements P1 and P2 may be determined by integrating the input power $P_{in}$ from the PV module 104 during certain portions of the AC grid voltage cycle and utilizing the accumulated power measurements to determine P1 and P2, and the voltage Vdc is determined by integrating the input voltage Vin from the PV module 104 over a portion of the AC grid voltage cycle.

One example of burst mode operation and of a technique for determining P1, P2, and Vdc may be found in commonly assigned, U.S. Pat. No. 7,768,155 entitled "Method and Apparatus for Improved Burst Mode during Power Conversion" and issued Aug. 3, 2010, which is herein incorporated by reference in its entirety.

The MPPT control module 312 uses P1 and P2 to determine the current PV module operating point with respect to the MPP and further determines a new DC voltage set point, Vdc-set, for operating the PV module 104 in order to achieve the MPP. The MPPT control module 312 couples the set point Vdc-set to the second terminal of the switch 328.

The power mode control module 336 controls the switch 328 such that the first terminal of the switch 328 is coupled to either the second terminal of the switch 328 (i.e., to receive the set point Vdc-set from the MPPT control module 312) or to a third terminal of the switch 328. The third terminal of the switch 328 is coupled to a fixed control voltage, Vreverse, for operating the PV module 104 at a negative power (i.e., reverse-power mode) when there is insufficient energy to operate the inverter in a forward-power generating mode.

The power mode control module 336 compares the value of the instantaneous input power Pin, received from the power monitor module 324, to a power threshold. When the input power Pin exceeds the power threshold, sufficient energy exists for the inverter 102 to generate real power and the power mode control module 336 drives the switch 328 such that the first terminal is coupled to the second terminal, thereby providing the set point Vdc-set from the MPPT control module 312 to the DC voltage control module 310. When the input power Pin is below the power threshold, there is insufficient energy for the inverter 102 to generate real power and the power mode control module 336 drives the switch 328 such that the first terminal is coupled to the third terminal, thereby providing the set point Vreverse to the DC voltage control module 310. In some embodiments, the set point Vdc-set may be on the order of 25 volts and the set point Vreverse may be on the order of 16 volts (V). By operating at a lower voltage during the reverse-power mode, e.g., below the "knee" of the PV module I-V curve, the negative current through the inverter 102 to the PV module 104 is limited to a negligible amount.

In some alternative embodiments, rather than determining when the input power Pin falls below a threshold and operating the switch 328 accordingly, the power mode control module 336 (or, alternatively, the MPPT control module 312) may operate such that the set point Vdc-set does not fall below a particular control voltage value, such as 16V.

As described above, the DC voltage control module 310 receives as an input a desired PV module set point of either Vdc-set or Vreverse, based on the state of the switch 328, and drives the inverter 102 such that the PV module 104 is biased at the desired set point. In accordance with the received set point, the DC voltage control module 310 determines a required level of output current, Ireq, from the inverter 102 that will result in biasing the PV module 104 at the desired set point. The DC voltage control module 310 drives the DC-AC inversion stage 208 to generate the output current Iout at the required level Ireq; when operating in the reverse-power mode, the DC voltage control module 310 allows the required current level Ireq to be a negative value. By driving the DC-AC inversion stage 208 to generate output current Iout at the required level, the DC voltage control module 310 modulates the current Iin drawn from the PV module 104 and thereby controls the voltage across the PV module 104.

In addition to the control signals received from the DC voltage control module 310, the DC-AC inversion stage 208 receives control signals from the conversion control module 314 for generating the output current Iout. The conversion control module 314 receives, from the AC monitoring circuit 216, samples of the AC current and AC voltage at the inverter output (i.e., signals indicative of the measured values of the voltage and current at the inverter output). The AC monitoring circuit 216 obtains such samples (i.e., measurements) of the AC current and AC voltage at the output of the inverter 102 and may comprise one or more ND converters for generating the current and voltage samples in a digital format. The AC monitoring circuit 216 may perform such sampling at a rate anywhere from approximately 1 ksps to approximately 10 Msps.

The conversion control module 314 generates a signal Vac indicative of the AC grid voltage (e.g., the grid voltage phase) and couples the signal Vac to the DC voltage control module 310 to be used in generating the control signal to drive the DC-AC inversion stage 208. Along with the DC voltage control module 310, the conversion control module 314 provides control signals for the DC-AC inversion stage 208 to convert a DC current I-inv input to the DC-AC inversion stage 208 to the AC output current Iout. One example of such power conversion is commonly assigned U.S. Pat. No. 7,796,412, entitled "Method and Apparatus for Converting Direct Current to Alternating Current" and issued Sep. 14, 2010, which is herein incorporated in its entirety by reference. The conversion control module 314 may drive the DC-AC inversion stage 208 to generate real power; additionally or alternatively, the conversion control module 314 may drive the DC-AC inversion stage 208 to generate reactive power (Volt-Ampere reactive, or VAr), for example as described in commonly assigned, U.S. Pat. No. 8,076,802 entitled "Method and Apparatus for Distributed VAr Compensation" and issued Dec. 13, 2011, which is herein incorporated by reference in its entirety. In accordance with one or more embodiments of the present invention, such VAr power may be generated when the inverter 102 is operating in a reverse-power mode. By allowing the inverter 102 to continue operating during periods of very low or no irradiance, as previously described, a sufficient voltage is maintained across the input capacitor 220 so that the inverter 102 can continue to provide VAr power (e.g., reactive power can be generated at night while being powered from the grid and with the supply being on the DC side).

In some embodiments, the inverter 102 may operate in a burst mode during low levels of input energy, for example prior to switching from a forward-power operating mode to a reverse-power operating mode, or prior to switching from the reverse-power operating mode to the forward-power operating mode. During burst mode, the inverter 102 stores energy during one or more grid voltage cycles and subsequently "bursts" the stored energy to the grid. In one or more embodiments, burst mode may be employed during periods of little to no irradiance (e.g., at night) by executing a hysteretic control on the inverter 102 based on the DC voltage—i.e., the inverter 102 runs "backwards" when the DC voltage is lower than one threshold (for example, 16V), but stops when higher than a second threshold (for example, 17V).

In addition to allowing the inverter 102 to perform functions such as housekeeping and VAr generation during extended periods of little to no irradiance, maintaining the PV module voltage set point at or above a minimum value (which also may be referred to as a threshold), as previously described, prevents the PV module set point from collapsing to zero during a rapid but brief drop in irradiance and allows the inverter 102 to continue functioning.

In some embodiments, the PV module voltage set point may be maintained at or above a minimum value for a time period at the end of the day (i.e., during and after sunset) until the inverter 102 completes all housekeeping activities, at which time the inverter 102 may then be shut down.

Examples of the power monitor module 324, the MPPT control module 312, and the DC voltage control module 310 may be found in the previously referenced U.S. Pat. No. 7,768,155 entitled "Method and Apparatus for Improved Burst Mode during Power Conversion" and issued Aug. 3, 2010. An example of at least a portion of the conversion control module 314 may be found in the previously mentioned U.S. Pat. No. 7,796,412, entitled "Method and Apparatus for Converting Direct Current to Alternating Current" and filed Mar. 20, 2007.

In some embodiments, the power mode control module 336 and the switch 328 are not actual components within the inverter 102 and are depicted in FIG. 3 merely for conceptual purposes. In such embodiments, the MPPT control module 312 is coupled to the DC voltage control module 310 and provides the DC voltage set point (Vdc-set) to the DC voltage control module 310. When the MPP desired voltage falls below a minimum operating voltage, a proportional-integral (PI) controller of the DC voltage control module 310 automatically reverses power control to a negative direction (i.e., from the grid to the inverter 102); one embodiment of such an implementation is described below with respect to FIG. 5. In some such embodiments, the power monitor module 324, the MPPT control module 312, the DC voltage control module 310, and the conversion control module 314 are analogous to the burst mode controller 224, the MPPT controller 212, the DC voltage controller 216, and the conversion control module 214, respectively, of the previously referenced U.S. Pat. No. 7,768,155, but operate such that the required level of output current, Ireq, may be a negative value.

The minimum operating voltage is generally determined such that energy is not consumed if the PV module 102 receives no sunlight. In certain embodiments, the minimum operating voltage may be set at 16V for a 60-cell PV module; additionally, the minimum operating voltage may be adjusted for ambient temperature.

Figure 4:
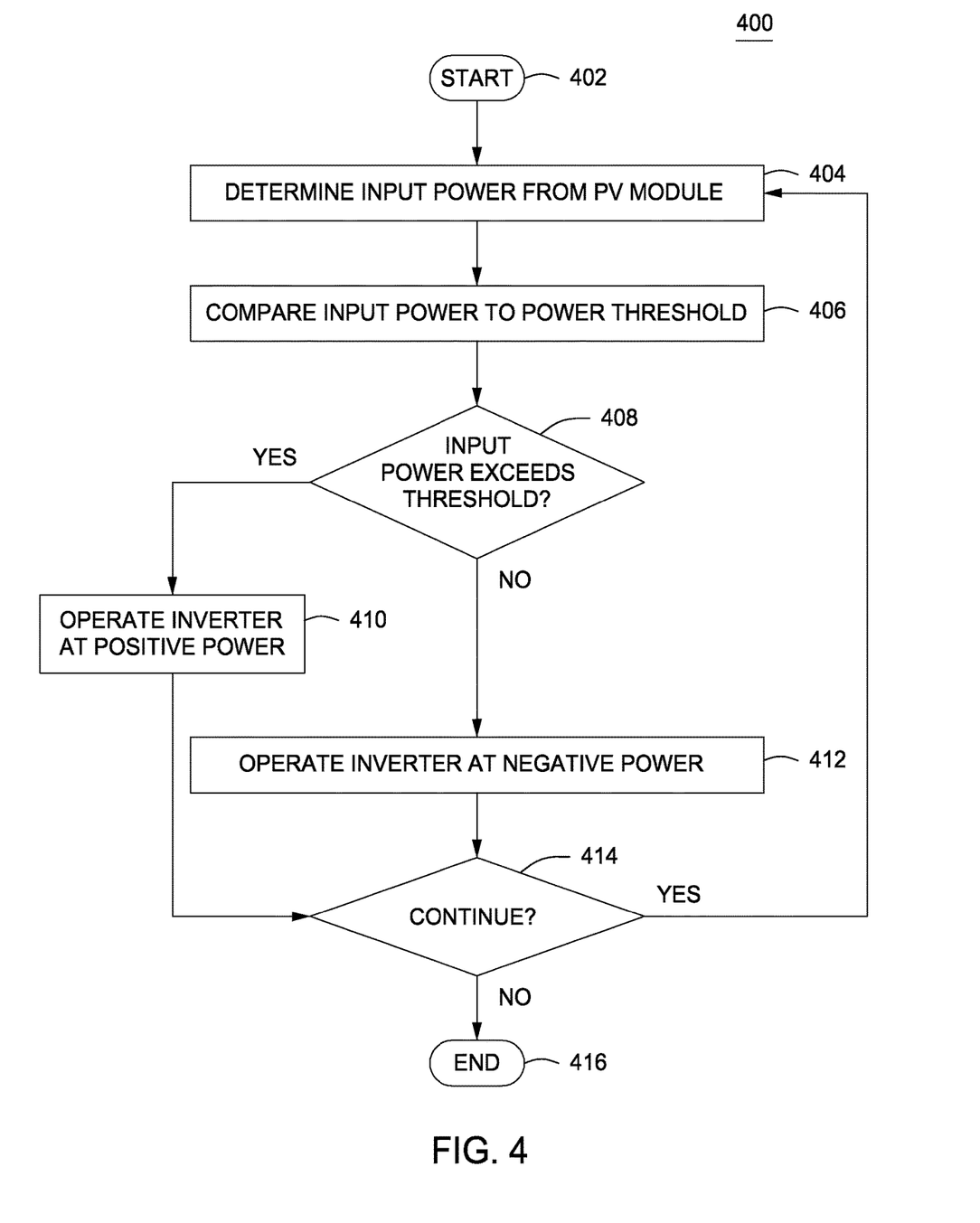
FIG. 4 is a flow diagram of a method for bidirectional power production in accordance with one or more embodiments of the present invention.

FIG. 4 is a flow diagram of a method 400 for bidirectional power production in accordance with one or more embodiments of the present invention. In some embodiments, such as the embodiment described below, a power conversion device, such as a DC-AC inverter, is coupled to a PV module and converts DC power from the PV module to AC power, where such AC power is coupled to a commercial power grid. In some embodiments, multiple PV modules may be coupled to a single centralized DC-AC inverter; alternatively, individual PV modules may be coupled to individual DC-AC inverters (i.e., one PV module per DC-AC inverter). The DC-AC inverter or inverters may additionally or alternatively receive DC power from one or more other suitable DC sources, such as other types of renewable energy sources (e.g., wind turbines, a hydroelectric system, or similar renewable energy source), a battery, or the like. In some embodiments, a DC-DC converter may be coupled between the PV module or PV modules and the DC-AC inverter(s).

The method 400 begins at step 402 and proceeds to step 404. At step 404, the inverter operates to convert DC power from the coupled PV module, such as the inverter 102 and the PV module 104 previously described, and the input power to the inverter from the PV module is determined. In some embodiments, input voltage and input current from the PV module may each be sampled and utilized to determine an instantaneous power from the PV module. At step 406, the input power is compared to a threshold.

At step 408, a determination is made whether the input power exceeds the threshold. If, at step 408, it is determined that the input power exceeds the threshold, the method 400 proceeds to step 410 where the inverter is operated to generate positive power. During such operation, which may also be referred to as operating in a "forward-power mode", a DC voltage set point for biasing the PV module is determined; for example, the DC voltage set point may be determined by a control module (such as the MPPT control module 312) to bias the PV module at a maximum power point (MPP). The DC voltage set point is then utilized to determine a required output current from the inverter which will result in biasing the PV module at the desired set point, for example as previously described with respect to the DC voltage control module 310. Based on the required inverter output current, one or more control signals are generated for driving a power conversion stage of the inverter, such as the DC-AC inversion stage 208. In some embodiments, the DC voltage set point during forward-power mode operation may be on the order of 25V. The method 400 proceeds from step 410 to step 414.

If, at step 408, it is determined that the input power does not exceed the threshold, the method 400 proceeds to step 412 where the inverter is operated to generate negative power. During such operation, which may also be referred to as operating in a "reverse-power mode", the DC voltage set point is set to a fixed value. For example, an input that receives the DC voltage set point may be switched from a first input that provides the computed DC voltage set point to a second input that provides a fixed voltage value (e.g., as previously described with respect to the switch 328 of the power mode control module 336). The fixed DC voltage set point value is a generally a lower value than the DC voltage set point when operating in the forward-power mode. By operating at a lower voltage during the reverse-power mode, e.g., below the "knee" of the PV module I-V curve, the resulting negative current through the inverter to the PV module is limited to a negligible amount. In some embodiments, the fixed DC voltage set point during reverse-power mode is on the order of 16V.

When operating in reverse-power mode, the inverter may continue to perform certain functions, such as housekeeping functions, indicating theft of a PV module and/or inverter, providing VAr power, and the like, as previously described.

The method 400 proceeds from step 412 to step 414. At step 414, a determination is made whether to continue operation. If the result of the determination is to continue operation, the method 400 returns to step 404; if the result of the determination is to not continue operation, the method 400 proceeds to step 416 where it ends.

Figure 5:
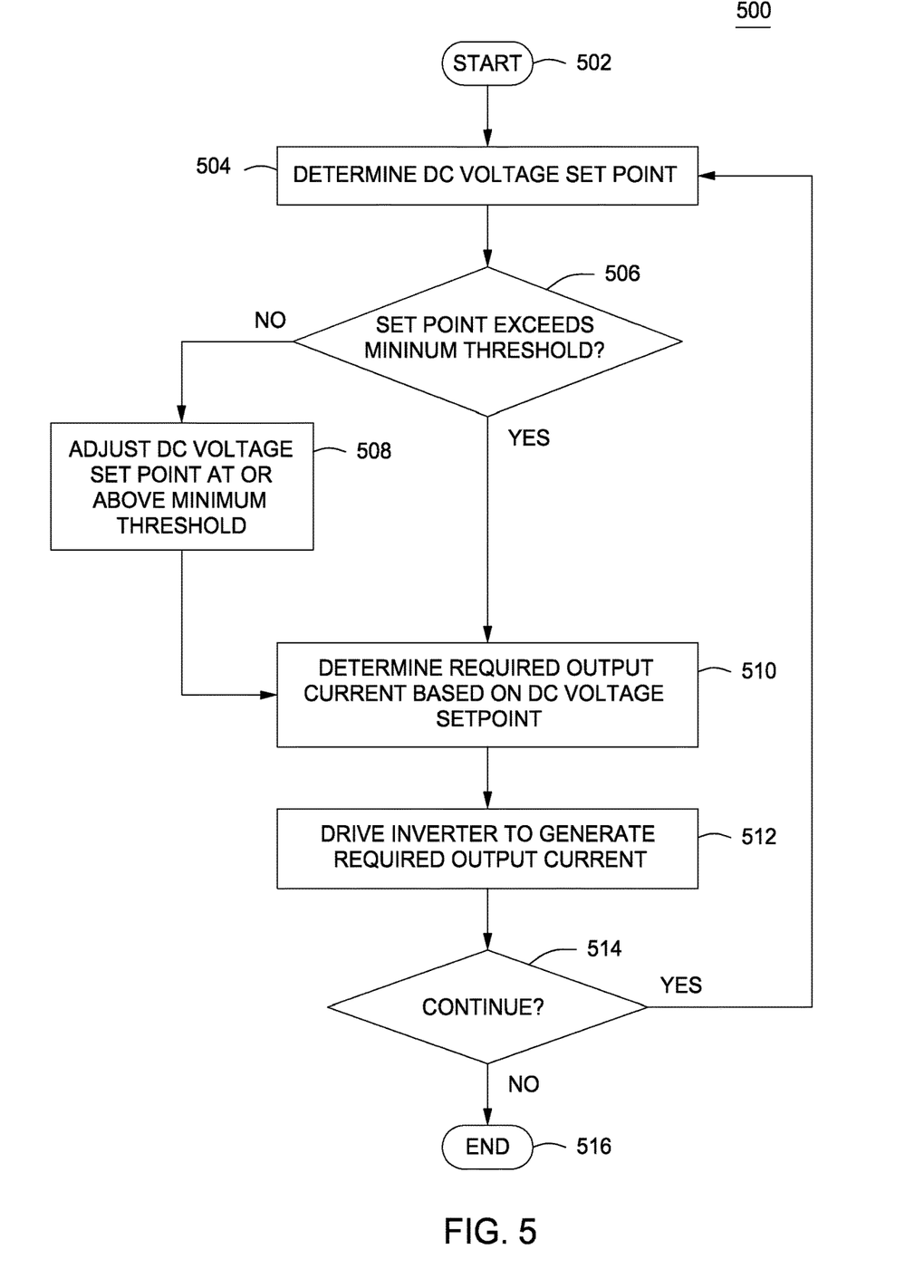
FIG. 5 is a flow diagram of an alternative method for bidirectional power production in accordance with one or more embodiments of the present invention.

FIG. 5 is a flow diagram of an alternative method 500 for bidirectional power production in accordance with one or more embodiments of the present invention. In some embodiments, such as the embodiment described below, a power conversion device, such as a DC-AC inverter, is coupled to a PV module and converts DC power from the PV module to AC power, where such AC power is coupled to a commercial power grid. During the power conversion, the inverter operates to generate an output current such that the PV module is biased at a desired DC voltage set point, as previously described.

In some embodiments, multiple PV modules may be coupled to a single centralized DC-AC inverter; alternatively, individual PV modules may be coupled to individual DC-AC inverters (i.e., one PV module per DC-AC inverter). The DC-AC inverter or inverters may additionally or alternatively receive DC power from one or more other suitable DC sources, such as other types of renewable energy sources (e.g., wind turbines, a hydroelectric system, or similar renewable energy source), a battery, or the like. In some embodiments, a DC-DC converter may be coupled between the PV module or PV modules and the DC-AC inverter.

The method 500 begins at step 502 and proceeds to step 504. At step 504, a DC voltage set point for biasing the PV module is determined; for example, the DC voltage set point may be determined by a control module (such as the MPPT control module 312) to bias the PV module at a maximum power point (MPP). At step 506, a determination is made whether the DC voltage set point exceeds (i.e., is greater than) a minimum threshold. If, at step 506, it is determined that the set point exceeds the minimum threshold, the method 500 proceeds to step 510. If, at step 506, it is determined that the set point does not exceed the minimum threshold, the method 500 proceeds to step 508.

At step 508, the set point is adjusted to remain equal to or greater than the minimum threshold. By maintaining the DC voltage set point at or above a minimum threshold, the DC voltage set point is prevented from collapsing to zero during periods of insufficient energy to operate the inverter in a forward-power generating mode, such as when there is little to no irradiance during night hours. Further, when there is insufficient energy for the inverter to continue operating in a forward-power generating mode, the inverter may still operate at a lower control voltage to generate negative power while limiting any resulting negative current through the inverter to a negligible amount. When operating to generate negative power, the inverter may continue to perform certain functions such as housekeeping functions, generating VAr power, providing an indication of PV module and/or inverter theft, and the like. In some embodiments, the DC voltage set point may generally be on the order of 25V with a minimum threshold of 16V. Such a minimum set point threshold allows the inverter to operate using a lower control voltage during periods of insufficient energy to operate the inverter in a forward-power generating mode and remain below the "knee" of the PV module I-V curve in order to limit the negative current through the inverter to a negligible amount. The method 500 proceeds from step 508 to step 510.

At step 510, the DC voltage set point is utilized to determine a required output current from the inverter which will result in biasing the PV module at the desired set point, for example as previously described with respect to the DC voltage control module 310. At step 512, one or more control signals are generated based on the required inverter output current for driving a power conversion stage of the inverter, such as the DC-AC inversion stage 208.

The method 500 proceeds from step 512 to step 514. At step 514, a determination is made whether to continue operation. If the result of the determination is to continue operation, the method 500 returns to step 504; if the result of the determination is to not continue operation, the method 500 proceeds to step 516 where it ends.

The foregoing description of embodiments of the invention comprises a number of elements, devices, circuits and/or assemblies that perform various functions as described. For example, the MPPT control module 312 is an example of a means for generating a DC voltage set point, the DC voltage control module is an example of a means for determining a required output current from the inverter 102 and driving the inverter 102 to generate the required output current, the conversion control module 314 is an example of a means for driving the inverter 102 to generate real and/or reactive power, and the power mode control module 336 is an example of a means for driving the inverter 102 to generate positive or negative power. These elements, devices, circuits, and/or assemblies are exemplary implementations of means for performing their respectively described functions.

While the foregoing is directed to embodiments of the present invention, other and further embodiments of the invention may be devised without departing from the basic scope thereof.

The invention claimed is:

1. A method for generating power, comprising:
  determining a value of a DC parameter pertaining to a DC power source providing DC power to an inverter;
  comparing the value to a pre-determined threshold based on an amount of an output from the DC power source; and
  dynamically selecting between operating the inverter to generate positive power or negative power based on a result of comparing the value to the pre-determined threshold.

2. The method of claim 1, wherein the inverter is operated to generate negative power when the value is less than the pre-determined threshold.

3. The method of claim 2, wherein the DC parameter is the DC power from the DC power source.

4. The method of claim 2, wherein the DC parameter is a DC voltage set point for biasing the DC power source.

5. The method of claim 2, further comprising setting, when the value is less than the pre-determined threshold, a DC voltage set point for the DC power source to a fixed value.

6. The method of claim 5, wherein setting the DC voltage set point to the fixed value causes the inverter to bias the DC power source to operate below a knee of a current-voltage (I-V) curve for the DC power source.

7. The method of claim 2, wherein the negative power powers a housekeeping supply of the inverter for performing at least one housekeeping function.

8. The method of claim 2, wherein the inverter is operated during nighttime to generate the negative power and further provides Volt-Ampere reactive (VAr) power while being powered from an AC grid, the AC grid coupled to an AC output of the inverter, and having DC power supplied on a DC side of the inverter.

9. An apparatus for generating power, comprising:
  an inverter for (i) determining a value of a DC parameter pertaining to a DC power source providing DC power to the inverter, (ii) comparing the value to a pre-determined threshold based on an amount of an output from the DC power source, and (iii) dynamically selecting between generating positive power or negative power based on a result of comparing the value to the pre-determined threshold.

10. The apparatus of claim 9, wherein the inverter generates negative power when the value is less than the pre-determined threshold.

11. The apparatus of claim 10, wherein the DC parameter is the DC power from the DC power source.

12. The apparatus of claim 10, wherein the DC parameter is a DC voltage set point for biasing the DC power source.

13. The apparatus of claim 10, wherein the inverter sets, when the value is less than the pre-determined threshold, a DC voltage set point for the DC power source to a fixed value.

14. The apparatus of claim 13, wherein setting the DC voltage set point to the fixed value causes the inverter to bias the DC power source to operate below a knee of a current-voltage (I-V) curve for the DC power source.

15. The apparatus of claim 10, wherein the negative power powers a housekeeping supply of the inverter for performing at least one housekeeping function.

16. The apparatus of claim 10, wherein the inverter generates the negative power during nighttime and further provides Volt-Ampere reactive (VAr) power while being powered from an AC grid, the AC grid coupled to an AC output of the inverter, and having DC power supplied on a DC side of the inverter.

17. A system for generating power, comprising:
  a plurality of photovoltaic (PV) modules; and
  a plurality of inverters coupled to the plurality of PV modules in a one-to-one correspondence, wherein each inverter of the plurality of inverters (i) determines a value of a DC parameter pertaining to a corresponding PV module, (ii) compares the value to a pre-determined threshold based on an amount of an output from the corresponding PV module, and (iii) dynamically selects between generating positive power or negative power based on a result of comparing the value to the pre-determined threshold.

18. The system of claim 17, wherein each inverter of the plurality of inverters generates negative power when the value it compares to the pre-determined threshold is less than the pre-determined threshold.

19. The system of claim 18, wherein the DC parameter is DC power from the corresponding PV module.

20. The system of claim 18, wherein the DC parameter is a DC voltage set point for biasing the corresponding PV module.

* * * * *